United States Patent [19]
Ozawa

[11] Patent Number: 5,206,569
[45] Date of Patent: Apr. 27, 1993

[54] SYSTEM FOR CONTROLLING LOCOMOTION OF LEGGED WALKING ROBOT

[75] Inventor: Nobuaki Ozawa, Saitama, Japan

[73] Assignee: Honda Giken Kogyo Kabushiki Kaisha, Tokyo, Japan

[21] Appl. No.: 800,648

[22] Filed: Nov. 27, 1991

[30] Foreign Application Priority Data

Nov. 30, 1990 [JP] Japan .................. 2-336418

[51] Int. Cl.⁵ ........................................ G05B 19/00
[52] U.S. Cl. ............... 318/568.12; 318/568.1; 318/568.22; 901/1; 901/9; 180/8.1; 395/95
[58] Field of Search ............... 318/567–572; 364/513; 901/1, 9; 180/8.1, 8.6; 395/80–99

[56] References Cited

U.S. PATENT DOCUMENTS

| | | | |
|---|---|---|---|
| 4,202,423 | 5/1980 | Soto | 180/8.6 |
| 4,408,286 | 10/1983 | Kikuchi et al. | 318/568.16 X |
| 4,621,332 | 11/1986 | Sugimoto et al. | 318/568 X |
| 4,625,285 | 11/1986 | Mori et al. | 318/568 |
| 4,641,251 | 2/1987 | Inoue | 901/1 X |
| 4,661,032 | 4/1987 | Arai | 901/9 |
| 4,712,052 | 12/1987 | Omae et al. | 318/625 |
| 4,826,392 | 5/1989 | Hayati | 395/95 |
| 4,834,200 | 5/1989 | Kajita | 180/8.1 |
| 4,906,907 | 3/1990 | Tsuchihashi et al. | 318/568.22 |
| 4,980,625 | 12/1990 | Shimada | 318/568.1 |
| 4,989,161 | 1/1991 | Oaki | 901/9 X |
| 5,021,878 | 6/1991 | Lang | 901/1 X |
| 5,040,626 | 8/1991 | Paynter | 180/8.1 |

Primary Examiner—Paul Ip
Attorney, Agent, or Firm—Lyon & Lyon

[57] ABSTRACT

A servo system for controlling the locomotion of a biped walking robot, having a body link and two leg linkages each connected to the body link and each including knee joint and ankle joint connecting an upper link and a lower link, to follow up a target angle for each drive joint predetermined in series with respect to time such that the robot walks. In order to cushion shock received at robot foot landing, moment generated at foot landing is detected and drive speed of the joints is feedback controlled in proportion to the detected moment so as to carry out a virtual compliance control on the robot foot.

9 Claims, 7 Drawing Sheets

FIG. 2
FIG. 3
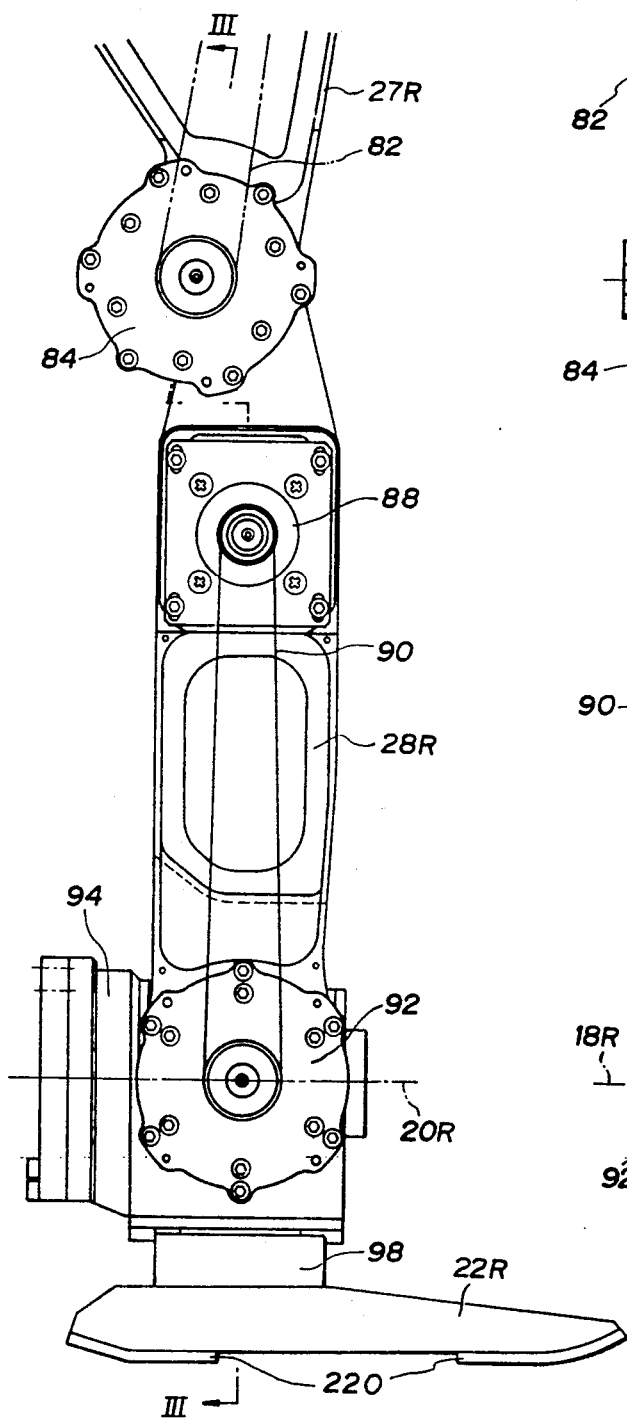
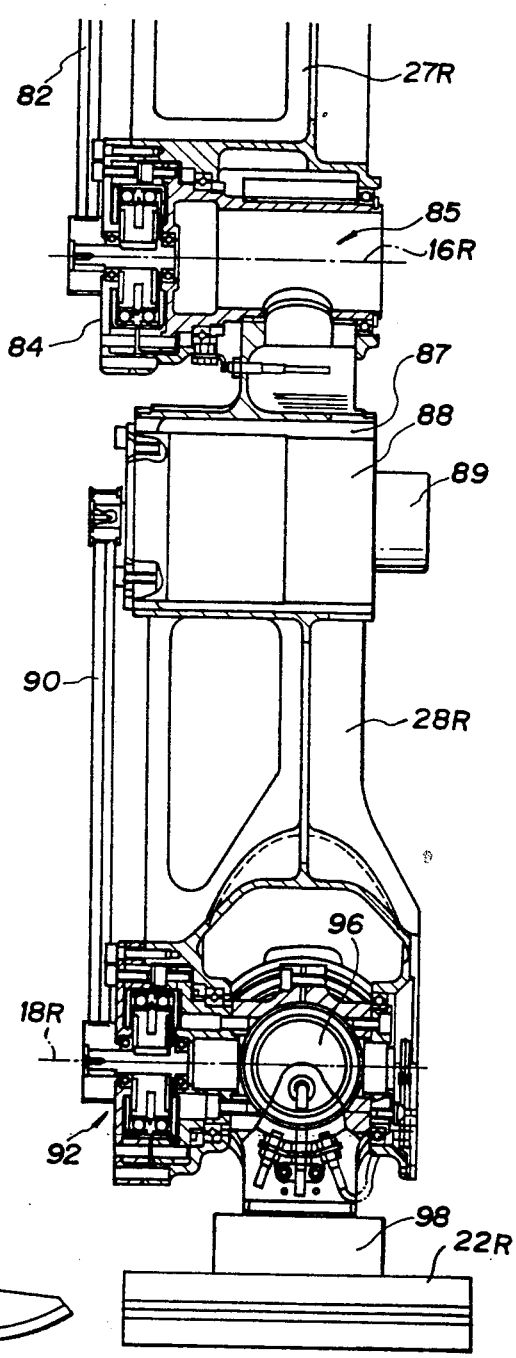

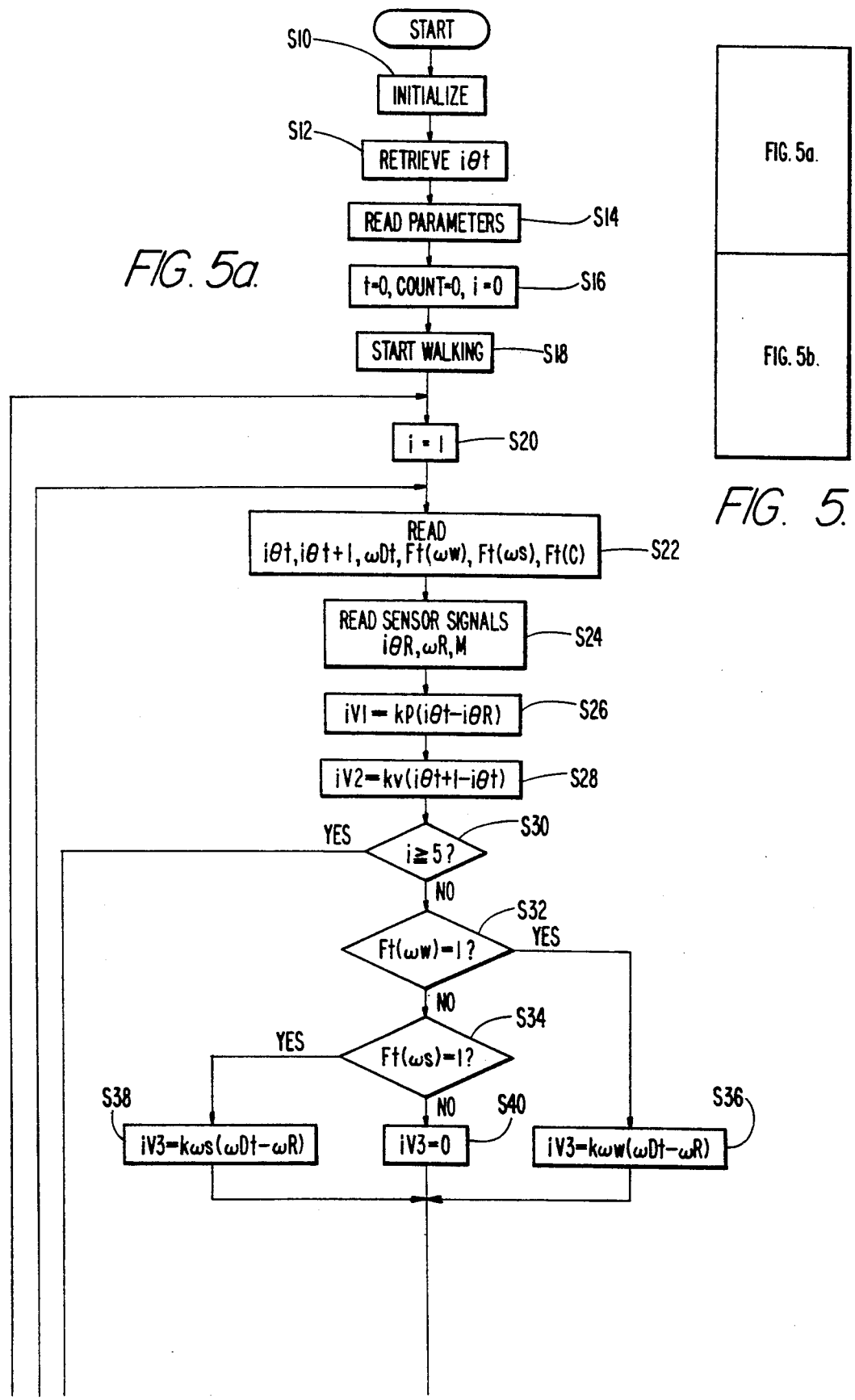

SYSTEM FOR CONTROLLING LOCOMOTION OF LEGGED WALKING ROBOT

BACKGROUND OF THE INVENTION

1. Field of the Invention

This invention relates to a system for controlling the locomotion of a legged walking robot and, more particularly, to a system for controlling the locomotion of a biped walking robot or the like which compliance-controls the leg links at the time of footfall to so as to achieve good terrain adaptability.

2. Description of the Prior Art

The considerable impact a walking robot receives from the ground when its free foot touches down is large enough to destabilize the robot's locomotion. For cushioning footfall impact (footfall being the event of placing or landing of a foot) the applicant previously proposed in Japanese Patent Application No. 1-297199 a system in which means for detecting the ankle moment caused by the impact with the ground is installed in the linkage of each leg and a speed command proportional to the magnitude of the detected moment is applied to an ankle drive motor for achieving a ground compliance operation. This system is based on the concept of virtual compliance control involving impedance control implemented using speed analysis control. [See "Virtual compliance control of multi-degree-of-freedom robots" (Collected papers of the Measurement and Automatic Control Society, Vol. 22, No. 3, March 1986.)] Although the proposed system makes a major contribution to stabilization of robot locomotion by enabling the impact at footfall to be absorbed to a satisfactory degree, it nevertheless still has the following drawback.

Even when the shock received upon landing of the feet becomes large, as during fast walking or when the robot is carrying a heavy object, the impact at the instant of footfall can still be adequately absorbed insofar as the compliance operation is quick, but since the speed with which the bottom of the foot strikes the ground under such circumstances is high, the foot tends to act as if it were trying to kick the ground so that, from an overall viewpoint, the impact absorption effect becomes worse rather than better. Slowing the compliance operation to avoid this problem does not help because this makes it impossible for the impact absorption to be carried out smoothly at the moment of footfall and thus causes the absorption of the impact to become insufficient. Therefore, insofar as the compliance speed is maintained constant throughout the footfall event, the impact absorption will be insufficient during fast walking, walking while carrying a heavy payload and the like, no matter what compliance speed is selected.

The first object of this invention is therefore to provide a system for controlling the locomotion of a legged walking robot whose system for controlling the compliance operation is able to provide control covering the full walking speed range from slow to fast and can achieve improved impact absorption irrespective of whether or not the robot is carrying a heavy payload.

In the control system according to the applicant's earlier Japanese patent application mentioned above, the switchover between the control of the compliance operation for absorbing and cushioning footfall impact and the ensuing position control in which no compliance operation is conducted is discontinuous and this discontinuity impairs smooth walking. For example, switchover occurring when a toe or heel is just above ground causes the toe or heel to kick against the ground, whereby the system generates an impact that would not otherwise occur.

The second object of the invention is therefore to provide a system for controlling the locomotion of a legged walking robot in which the transition from impact absorption control to position control is carried out smoothly.

Moreover, in the control system according to the earlier patent application the impact absorption control is initiated only after a footfall signal has been received. Thus in cases such as where the leg linkage of the free leg comes in contact with something projecting above the ground, it is not possible to realize the desired flexible "willow-in-the-wind" control of the ankle because the system is conducting position control at this time. If the ankle should be able to yieldingly adapt to external force at such times, the impact received by the robot would be considerably moderated and the danger of toppling would be greatly diminished.

The third object of the invention is therefore to provide a system for controlling the locomotion of a legged walking robot which is capable of also controlling the ankle of the free leg for coping with situations such as that just described.

SUMMARY OF THE INVENTION

This invention achieves these objects by providing a system for controlling locomotion of a legged walking robot having a plurality of leg linkages each made up of a foot portion and an upper portion connected by a drive joint. Said system comprises first means for detecting external force acting on each leg linkage when the foot portion comes into contact with the ground, second means for determining a drive speed of the joint in responsive with the detected force and a feedback gain to be multiplied thereto and set variable with respect to time, and servo control means for driving the joint at the speed to follow up a target value in order to carry out a virtual compliance control on the foot portion. Thus, since the control gain is varied over the course of time, it can be set at a relatively large initial value so as to enable effective impact absorption over the full range of walking speeds and irrespective of the weight of the payload the robot is carrying.

BRIEF EXPLANATION OF THE DRAWINGS

These and other objects and advantages of the invention will be more apparent from the following description and drawings, in which:

FIG. 2 is a side view and shows the construction from the knee on down of the robot illustrated schematically in FIG. 1;

FIG. 3 is a sectional view taken along line III—III of FIG. 2;

FIG. 5, comprising FIGS. 5A and 5B, is a flowchart showing the operation of the control unit of FIG. 4;

DETAILED DESCRIPTION OF THE INVENTION

Figure 1:
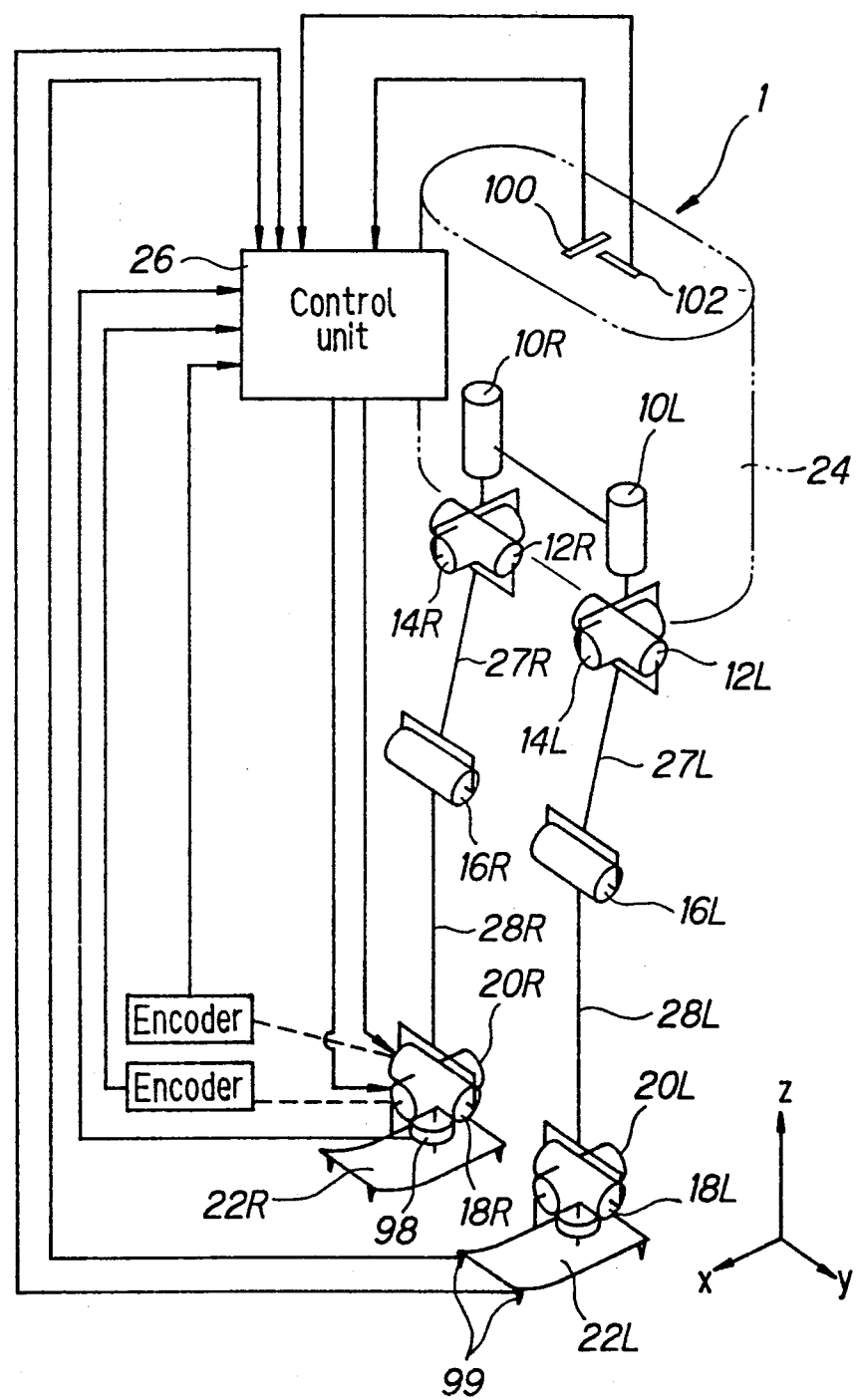
FIG. 1 is an overall skeleton view of a biped walking robot according to the present invention.

The invention will now be explained with reference to a biped walking robot as a specific embodiment of a legged walking robot. An overall skeleton view of the biped walking robot is shown in FIG. 1. The robot, designated by reference numeral 1, is provided with six joints (axes) on each of its right (R) and left (L) legs. From the top down, these joints (axes) are hip turning joints (axes) 10R, 10L, hip pitch direction joints (axes) 12R, 12L, hip roll direction joints (axes) 14R, 14L, knee pitch direction joints (axes) 16R, 16L, ankle pitch direction joints (axes) 18R, 18L, and ankle roll direction joints (axes) 20R, 20L. The pitch direction is the direction indicated by x and the roll direction is the direction indicated by v as shown in the right bottom of the figure. Feet 22R, 22L are attached below and a body (main unit) 24 is disposed at the uppermost position. The body 24 houses a control unit 26.

In this arrangement, joints (axes) 10R (L), 12R (L) and 14R (L) together constitute a right (left) hip joint. The three axes meet at a single point. The joints (axes) 18R (L) and 20R (L) together form a right (left) ankle, wherein these two axes also intersect perpendicularly. The three pitch direction joints (axes) 12R (L), 16R (L) and 18R (L) are mutually parallel and the positional relationship thereamong remains unchanged irrespective of the behavior of the other joints (axes). As illustrated, each leg has six degrees of freedom and each foot 22R (L) can be placed at the desired position in the desired direction irrespective of the fact that it is attached to the body 24. Specifically, during walking the legs as a whole can be moved as desired by appropriately driving the 12 (6×2) joints (axes) for varying their individual angles, thus enabling desired walking in three-dimensional space. The hip joints and the knee joints are connected by thigh linkages 27R, 27L and the knee joints and ankle joints are connected by crus linkages 28R, 28L.

The joints are constituted mainly of motors and reduction gear mechanisms. The arrangement of the knee will now be explained in detail with reference to FIGS. 2 and 3. Although a detailed description of the hip joints will not be given, it should be understood that they are of a similar structure to the knees. As the left and right legs are laterally symmetrical, only the right leg will be explained in the following.

Referring to FIGS. 2 and 3, the output of a motor (not shown) mounted at an intermediate portion of the thigh linkage 27R is transmitted via a belt 82 to the input shaft of a harmonic reduction gear 84 installed at the knee joint (axis) 16R. The upper end of the crus linkage 28R is formed with a recess 87 which accommodates a motor 88, the output of which is input through a belt 90 to a harmonic reduction gear 92 provided at the ankle, whereby the right foot member 22R is driven in the pitch direction about the axis 18R. The foot 22R is further arranged to swing freely in the roll direction about the axis 20R perpendicularly intersecting the axis 18R. For this purpose, there is provided a harmonic reduction gear 94 and a motor 96 for supplying power directly thereto. Each of the motors is provided with a rotary encoder. (Only the rotary encoder 89 for the motor 88 is shown in the drawings.)

The ankle is further provided with a six-dimensional force and torque sensor 98 for measuring the x, y and z components transmitted to the robot through the foot and also separately measuring the three directional components of the moment, so as to detect whether or not the foot has landed and the force acting on the supporting leg. The bottom of the foot is approximately flat and is provided with elastic members 220 made of rubber or the like for absorbing the impact received at time the foot touches down. The four corners of the foot bottom are further provided with ground contact switches 99 (not shown in FIGS. 2 and 3) of conventional design for detecting contact between the foot and ground. Further, as shown in FIG. 1, a pair of inclination angle sensors 100, 102 are provided at an appropriate location on the body 24 for detecting (a) the amount of angle and angular velocity of the inclination relative to the z-axis in the x-z plane and (b) the amount of angle and angular velocity of the inclination relative to the z-axis in the y-z plane. The outputs of the inclination angle sensors 100, 102 are sent to the control unit 26 housed in the body 24.

Figure 4:
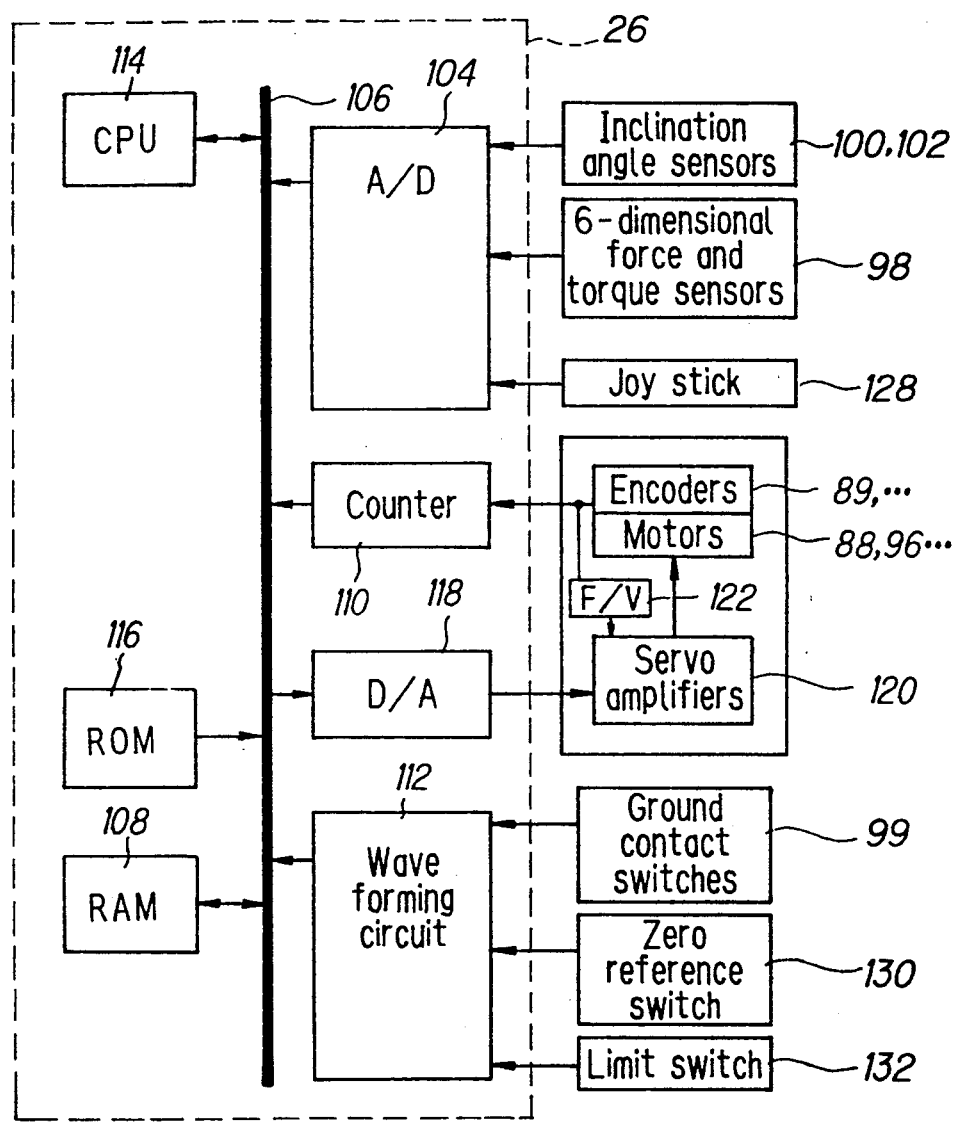
FIG. 4 is a detailed block diagram of the control unit shown in FIG. 1.

As shown in the detailed block diagram of FIG. 4, the control unit 26 is constituted as a microcomputer. Here the outputs of the inclination angle sensors 100, 102 etc. are converted to digital values in an A/D converter 104, the output of which is forwarded to a RAM (random access memory) 108 via a bus 106. The outputs of the encoder 89 etc. are sent to the RAM 108 through a counter 110 and the outputs of the ground contact switches 99 etc. are passed through a wave forming circuit 112 and stored in the RAM 108. The control unit has a CPU (central processing unit) 114 which, in the manner to be explained later, reads in the stored locomotion data, calculates speed control commands on the basis of the deviation between the stored locomotion data and measured values received from the counter 110, and forwards the calculated speed control commands through a D/A converter 118 to a servo amplifier 120 for respective motors. The encoder output is further sent through an F/V converter 122 to the servo amplifier 120, whereby a minor loop for speed feedback control is established in each motor. Reference numeral 128 designates a joy stick, 130 a zero reference switch for determining the origin (upright) posture, and 132 a limit switch for preventing overrun.

Figure 5B:
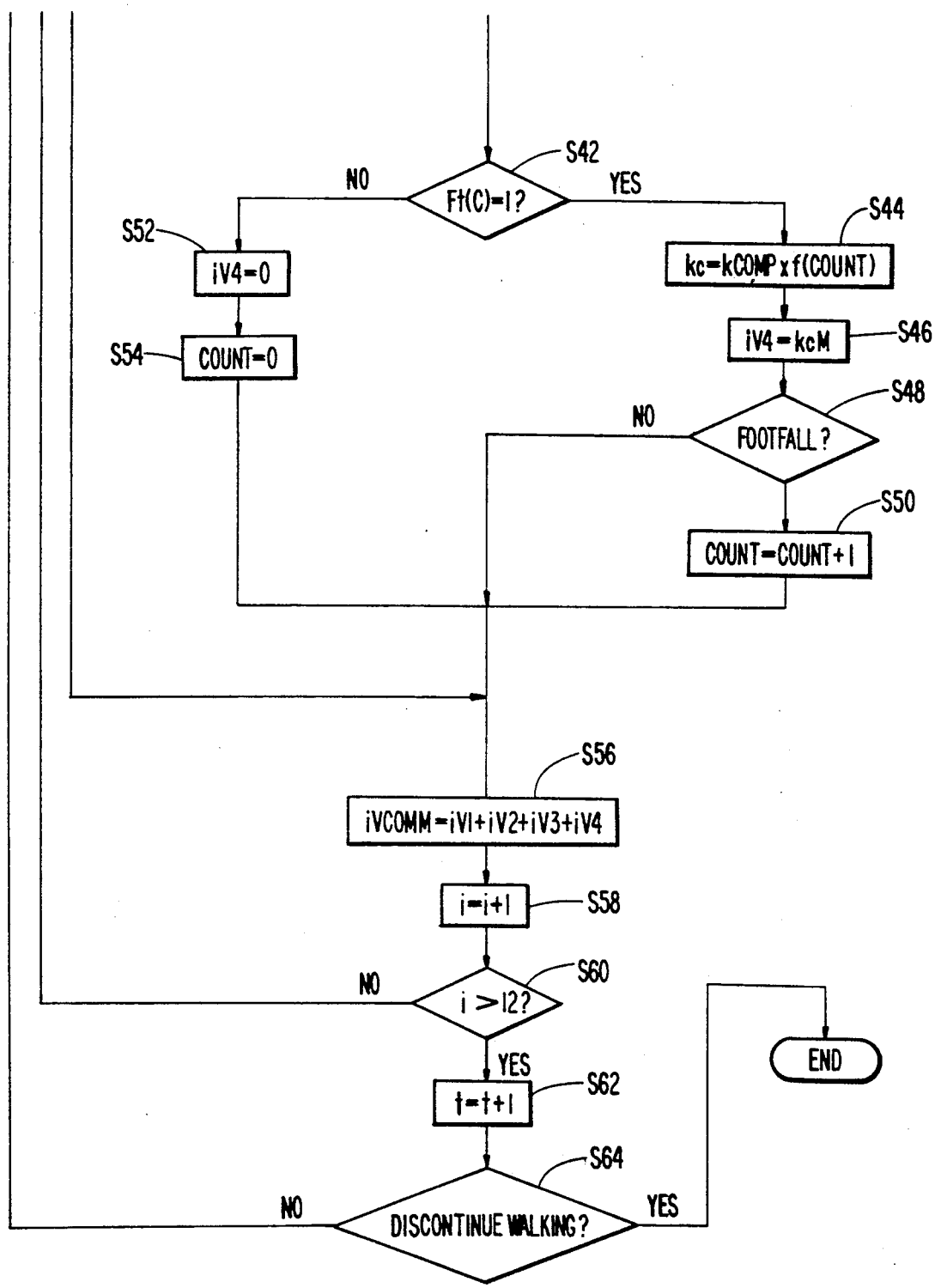

The operation of the control system will now be explained with reference to the flowchart of FIG. 5. The control shown in this figure assumes offline setting of the target joint angles in advance and the use of the earlier mentioned virtual compliance control technique.

The operation commences with step S10 in which the various sections of the system are initialized and then moves to step S12 where a locomotion pattern i$\theta$t is retrieved. This pattern indicates the joint angle target values for walking of the robot over an ideal flat surface of uniform hardness. The prefix "i" indicates the joint number and the suffix "t" indicates the joint angle at time t. The joints are numbered from the bottom up as 20R=1, 20L=2, . . . These time series data are calculated in advance using a large computer as earlier mentioned and stored in a ROM 116 of the microcomputer.

The procedure then advances to step S14 in which the parameters kp, kv . . . are read in. These are feedback gains which will be explained in detail later. In the following step S16 the timer value t, the counter value COUNT and the joint number (counter) value i are reset to zero, whereafter walking is started in step S18 and the value of the counter for counting the joint numbers i is set to 1 at step S20. The operation then advances to step S22 in which the parameters for the joint angle i$\theta$t (i=1) etc. corresponding to the currently set joint number are retrieved from memory. The notation i$\theta$t+1 appearing in the flowchart indicates the target joint angle for the time t+1 following the current time t, namely for time at which the next program cycle begins. A value omega Dt indicates the target angular velocity (to be explained later). And Ft(omega w) is a flag which indicates the two-leg support period, Ft(omega s) a flag indicating the one-leg support period, and Ft(C) a flag indicating the impact absorption control period. The microcomputer determines when the procedure is in this period on the basis of the outputs from the respective six-dimensional force and torque sensor 98 and the like and sets the flag bit to 1 at this time.

Figure 6:
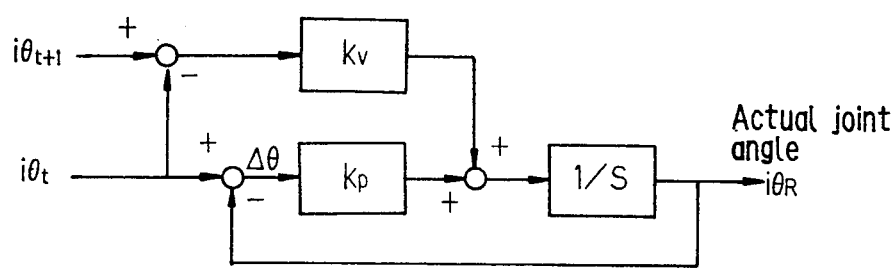
FIG. 6 is a block diagram showing control algorithm on drive joints other than ankle joints carried out in procedures in the flowchart of FIG. 5.

Next, in step S24, the outputs of the inclination sensors etc. are read in. Here a value i$\theta$R indicates the actual angle of the i-th joint, a value omega R the actual inclination angular velocity, and a value M the actual moment acting on the foot. The operation then advances to step S26 in which the position feedback control value iV1 is calculated and to step S28 in which the speed feedback (forward) control value iV2 is calculated. In other words, as shown in FIG. 6, in the control system according to the invention there is output to the servo amplifier 120 concerned a speed control value equal to the sum of a feedback value obtained by multiplying the deviation delta $\theta$ between the joint angle command value i$\theta$t and the actual joint angle i$\theta$R by a proportional gain kp and a feedback value obtained by multiplying the deviation between the joint angle command value i$\theta$t at time t and the joint angle command value i$\theta$t+1 at time t+1 by a gain kv. It should be noted, however, that the block diagram of FIG. 6 relates to the joints other than the ankle joints and that, as shown in the block diagram of FIG. 7, in the case of the ankle joints there are also fed back control values based on compliance control and the like. This will be explained in more detail later.

Figure 7:
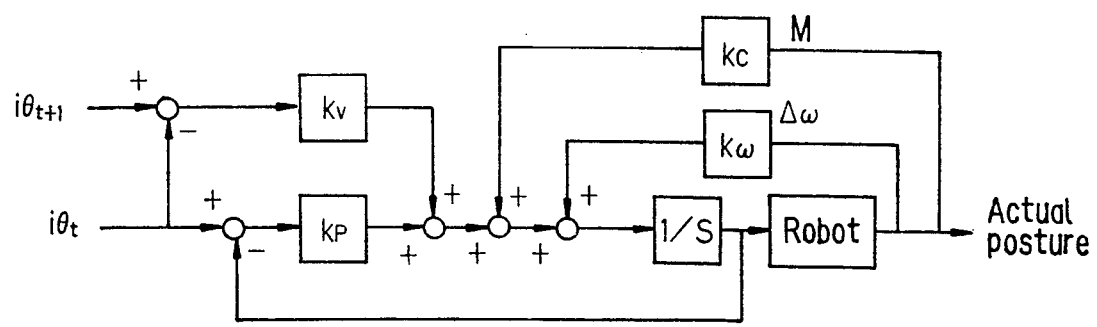
FIG. 7 is a block diagram similar to FIG. 6, but shows control algorithm on the ankle joints.

The operation then advances to step S30 in which discrimination is made as to whether or not the joint number i has become 5 or greater, namely as to whether or not the control value of other than the ankle joints is in the process of being calculated, and since the result is of course negative, the procedure moves onto step S32 and the ensuing steps in which, first, inclination angular velocity feedback and the like are carried out. Specifically, in steps S32 to S34 it is discriminated whether the flag Ft(omega w) or flag Ft(omega s) is on (whether the robot is in a two-leg support state or a one-leg support state) and, based on the result of this discrimination, the procedure advances to step S36 or S38 in which a third speed feedback control value iV3 is calculated, as shown in FIG. 7, by multiplying the deviation delta omega between the target inclination angular velocity omega Dt and the actual inclination angular velocity omega R by gain k omega.

Figure 8:
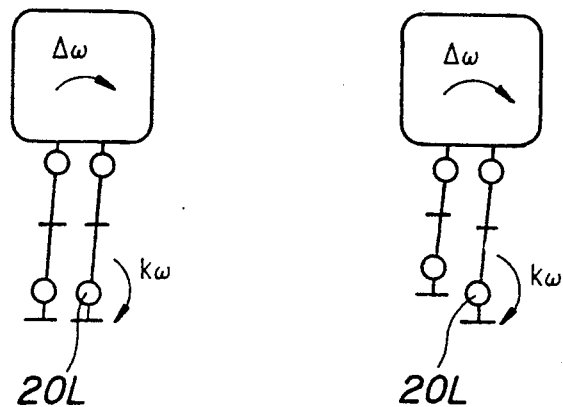
FIGS. 8 shows a gain used in a feedback control based on the inclination angle of the robot carried out in the flowchart of FIG. 5.

Simply stated, what this means is that in addition to conducting compliance control, the control system also implements stability control with respect to the ankle of the supporting leg for preventing the robot from toppling when it has been judged that the inclination angular velocity deviates from the target value or that an external moment is acting on the ankle. Specifically, on such occasions the control system drives the ankle of the supporting leg in accordance with the degree of deviation in order to produce a reactive force with respect to the ground and thus correct the robot's attitude as required to prevent the robot from falling over. The gain k omega is defined as shown in FIG. 8 during the two-leg support period and during the one-leg support period. FIG. 8 shows in its left an example of the direction of the inclination angular velocity deviation delta omega acting on the robot when the robot is viewed from the front. In this case, the direction of the gain for the ankle joint 20L which is under load owing to the action of the inclination angular velocity deviation delta omega is defined as indicated in the figure. FIG. 8 shows in its right the state of the robot during one-leg support as viewed from the front. In this case, the sign of the gain k omega is defined so as to drive the ankle joint 20L of the supporting leg in the indicated direction. In the procedure according to the flowchart of FIG. 5, when it is found that the robot is in neither the two-leg support state nor the one-leg support state, the control value in step S40 is zero.

Figure 9:
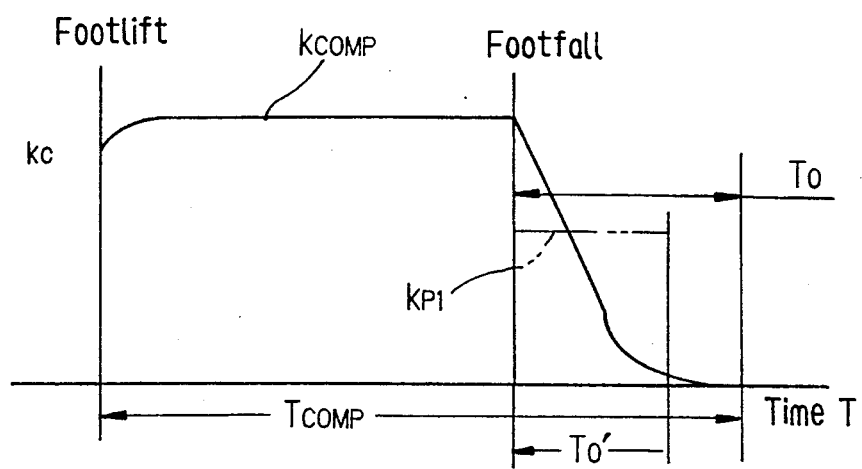
FIG. 9 is a timing chart showing a period in which a virtual compliance control according to the flowchart of FIG. 5 is carried out and illustrates a gain used in the control.

The operation then moves to step S42 in which the virtual compliance control value is determined. Specifically, as shown in FIG. 9 a prescribed period TCOMP between footlift (the event of lifting a foot) and footfall of the robot's free leg is defined as the impact absorption control period, and when it is judged in step S42 that the operation has entered this period, the procedure advances to step S44 in which the gain kc is calculated as kc=kCOMP×f(COUNT), to step S46 in which a fourth speed feedback value iV4 is calculated by multiplying kc by the detected moment M (as shown in FIG. 7), and then, after detection of footfall in step S48, to step 50 in which the counter value is incremented. In other words, the impact absorption gain is established as a function of the count value COUNT and, as shown in FIG. 9, beginning from the time of footfall this gain is progressively diminished to zero over the course of time. When it is found in step S42 that the operation is not in the impact absorption period, the procedure goes to step S52 in which the control value iV4 is set to zero and then to step S54 in which the counter value is reset to zero.

Next, in step S56, all of the calculated control values are added together to obtain a sum iVCOMM which is output to the servo amplifier 120 for the motor concerned, whereafter the joint number counter is incremented in step S58, discrimination is conducted in step S60 as to whether this is the last joint and, if it is, the timer value t is incremented for retrieval of the next target joint angle in step S62 and, so long as it is not found in step 64 that walking is to be discontinued, control values are continuously determined for the respective joints.

As will be understood from the embodiment just described, in the virtual compliance control the gain kc is determined simultaneously with the detection of footlift and is diminished with the passage of time following the detection of footfall. In the applicant's earlier Japanese application, the gain (which was referred to as kpl) was set at a constant value as indicated by the phantom line in FIG. 9 and the control period was limited to a prescribed period To' reckoned from footfall. In contrast, in the present invention the gain kc is progressively reduced with the passage of time and, therefore, can be set at a large initial value, whereby it becomes possible to effectively absorb the impact at footfall over the full range of walking speeds and irrespective of the weight of the payload the robot is carrying.

Moreover, since the gain kc is set simultaneously with footlift (i.e. at the beginning of compliance control) and the relatively large value set at this time is not reduced until footfall, any unexpected impact that should be encountered owing to contact of the free leg linkage with an obstacle can be absorbed to a substantial degree.

Further, since the gain is still high at the instant of footfall, the impact at footfall can be efficiently absorbed, and since the gain is thereafter sharply attenuated, a fully sufficient absorption effect can be realized without giving rise to control hunting or the like.

Also, since the gain kc is substantially zero at the end of the impact absorption control period, the transition to the following position control can be made smoothly.

Although the invention was described with respect to an example that involves inclination angular velocity feedback control, it should be understood that the control system of the invention is based on a fundamentally independent concept and, as such, can be implemented independently of such control, although the effect of the invention is enhanced by the better walking stability obtained when implemented in conjunction with such control.

Moreover, while the invention was described with respect to an example in which the target joint angles (and target angular velocity) are calculated offline, it is not limited to such an arrangement but conceptually encompasses the case where the target walking data is calculated in real time.

In addition, while the invention was described with respect to a biped walking robot, it is applicable not only to such robots but also to robots having three or more legs.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling locomotion of a biped walking robot having a body and two leg linkages each connected to the body and each made up of a foot portion and a leg portion connected by an ankle drive joint, comprising:
   first means for detecting moment or force acting on one leg linkage;
   second means for measuring time after the one leg linkage is lifted from the ground;
   third means for determining a drive speed of the ankle drive joint of the one leg linkage by multiplying the detected value by a gain set with respect to time; and
   servo motor means for driving the ankle drive joint at the drive speed in order to provide compliance to the foot portion of the one leg linkage.

2. A system according to claim 1 wherein the gain is set at a predetermined value until the foot portion of the one leg linkage has come into contact with the ground after the foot portion was lifted from the ground and is attenuated within a predetermined period after the foot portion has come into contact with the ground.

3. A system according to claim 2, wherein the gain is attenuated to zero when the predetermined period has expired.

4. A system for controlling locomotion of a biped walking robot having a body and two leg linkages each connected to the body and each made up of a foot portion and a leg portion connected by an ankle drive joint, comprising:
   first means for detecting moment or force acting on each leg linkage;
   second means for measuring time after one leg linkage is lifted from the ground;
   third means for determining a first target drive speed of the ankle drive joint by multiplying the detected moment or force by a gain set with respect to time;
   fourth means for detecting angular velocity of the robot body;
   fifth means for calculating a deviation between the detected angular velocity and a target angular velocity to determine a second target drive speed of the ankle drive joint of the other leg linkage supporting the weight of the robot by multiplying the deviation by a gain; and
   servo motor means for driving the one leg linkage at the first target drive speed and for driving the other leg linkage at the second target drive speed.

5. A system according to claim 4, wherein said ankle drive joint has two degrees of freedom to move the foot portion in one direction and in a second direction perpendicular thereto, and said second target drive speed of the ankle drive joint of the other leg linkage is determined in such a manner that the ankle drive joint is driven at said second target drive speed in a direction in which the attitude of the robot is stabilized.

6. A system for controlling locomotion of a biped walking robot having a body and two leg linkages each connected to the body and each having a foot portion and a leg portion connected by an ankle drive joint, the ankle drive joint having two degrees of freedom to move the foot portion in one direction and in a second direction perpendicular thereto, comprising:
   first means for detecting moment or force acting on each leg linkage;
   second means for measuring time after one leg linkage is lifted from the ground;
   third means for determining a first target drive speed of the ankle joint of the one leg linkage by multiplying a detected value of moment or force by a gain set with respect to time;
   fourth means for detecting an angle of the ankle drive joint of the one leg linkage;
   fifth means for calculating a deviation between the detected angle and a target angle to determine a second target drive speed of the ankle drive joint of the one leg linkage by multiplying the deviation by a gain; and
   servo motor means for accumulating the first and the second target drive speeds of the ankle drive joint to drive the ankle drive joint at an accumulated drive speed.

7. A system for controlling locomotion of a biped walking robot having a body and two leg linkages each connected to the body by a hip drive joint and each having a foot portion and a leg portion connected by an ankle drive joint, the hip drive joint having at least two degrees of freedom and the ankle drive joint having two degrees of freedom, comprising:
- first means for detecting moment or force acting on each leg linkage;
- second means for measuring time after one leg linkage is lifted from the ground;
- third means for determining a first target drive speed of the ankle joint of the one leg linkage by multiplying a detected value of moment or force by a gain set with respect to time;
- fourth means for detecting an angle of the ankle drive joints and the hip drive joints;
- fifth means for calculating a deviation between target angles of the ankle drive joints and the hip drive joints to determine a second target drive speed for each of the ankle drive joints of the hip drive joints by multiplying the deviation by a gain;
- sixth means for detecting angular velocity of the robot body;
- seventh means for calculating a deviation between the detected angular velocity and a target angular velocity to determine a third drive speed of the ankle drive joint of the other leg linkage supporting the weight of the robot by multiplying the derivation by a feedback gain; and
- servo motor means for accumulating the target drive speeds to drive each of the ankle drive joints and the hip drive joints at an accumulated drive speed.

8. A system for controlling locomotion of a biped walking robot having a body and two leg linkages each connected to the body by a hip drive joint and each having a foot portion and a leg portion connected by an ankle drive joint, the hip drive joint having at least two degrees of freedom and the ankle drive joint having two degrees of freedom, comprising:
- first means for detecting moment or force acting on each leg linkage;
- second means for measuring time after one leg linkage is lifted from the ground;
- third means for determining a first target drive speed of the ankle joint of the one leg linkage by multiplying a detected value of moment or force by a gain set with respect to time;
- fourth means for detecting an angle of the ankle drive joints and the hip drive joints;
- fifth means for calculating a deviation between target angles at time t of the angle drive joints and the hip drive joints to determine a second target drive speed for each of the ankle drive joints and the hip drive joints by multiplying the deviation by a gain;
- sixth means for calculating a deviation between a target angle at time t and a target angle at a next time t+1 to determine a third target drive speed for each of the ankle drive joints and the hip drive joints;
- seventh means for detecting angular velocity of the robot body;
- eighth means for calculating a deviation between the detected angular velocity and a target angular velocity to determine a fourth drive speed of the ankle drive joint of the other leg linkage supporting the weight of the robot, by multiplying the deviation by a gain; and
- servo motor means for accumulating the target drive speeds to drive each of the ankle drive joints and the hip drive joints at an accumulated drive speed.

9. A system for controlling locomotion of a biped walking robot having a body and two leg linkages each connected to the body by a hip drive joint and each having a foot portion and a leg portion connected by an ankle drive joint, the leg portion having a thigh link and a crus link connected by a knee ankle joint, comprising:
- first means for detecting moment or force acting on each leg linkage;
- second means for measuring time after one leg linkage is lifted from the ground;
- third means for determining a first target drive speed of the ankle joint of the one leg linkage by multiplying a detected value of moment or force by a gain set with respect to time;
- fourth means for detecting each angle of the hip, knee and ankle drive joints;
- fifth means for calculating a deviation between the detected angle and a target angle to determine a second target drive speed for each of the hip joints and the knee drive joints and the ankle drive joints by multiplying the deviation by a gain;
- sixth means for detecting angular velocity of the robot body;
- seventh means for calculating a deviation between the detected angular velocity and a target angular velocity to determine a third target drive speed of the ankle drive joint of the other leg linkage supporting the weight of the robot, by multiplying the deviation by a gain; and
- servo motor means for accumulating the target drive speeds to drive the hip drive joints, the knee drive joints and the ankle drive joints at an accumulated drive speed.

* * * * *